(12) United States Patent
Dolan et al.

(10) Patent No.: US 9,684,569 B2
(45) Date of Patent: Jun. 20, 2017

(54) DATA DEDUPLICATION USING CHUNK FILES

(71) Applicant: Western Digital Technologies, Inc., Irvine, CA (US)

(72) Inventors: Michael A. Dolan, Orange, CA (US); Linh Kochan, Newport Coast, CA (US); Tamir Ram, Sunnyvale, CA (US); Sean Rohr, Eastvale, CA (US); Kent Tu, Orange, CA (US); Shawn Miller, Aliso Viejo, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/673,785

(22) Filed: Mar. 30, 2015

(65) Prior Publication Data

US 2016/0292048 A1 Oct. 6, 2016

(51) Int. Cl.
  *G06F 11/14* (2006.01)
  *G06F 3/06* (2006.01)

(52) U.S. Cl.
  CPC .......... *G06F 11/1469* (2013.01); *G06F 3/065* (2013.01); *G06F 3/0608* (2013.01); *G06F 3/0619* (2013.01); *G06F 3/0641* (2013.01); *G06F 3/0688* (2013.01); *G06F 11/1451* (2013.01); *G06F 11/1453* (2013.01); *G06F 2201/80* (2013.01); *G06F 2201/84* (2013.01)

(58) Field of Classification Search
  CPC ............. G06F 11/1451; G06F 11/1453; G06F 11/1469; G06F 3/0608
  USPC .................................................. 711/103, 162
  See application file for complete search history.

(56) References Cited

U.S. PATENT DOCUMENTS

| | | |
|---|---|---|
| 6,499,054 B1 | 12/2002 | Hesselink et al. |
| 6,732,158 B1 | 5/2004 | Hesselink et al. |
| 7,120,692 B2 | 10/2006 | Hesselink et al. |
| 7,454,443 B2 | 11/2008 | Ram et al. |
| 7,467,187 B2 | 12/2008 | Hesselink et al. |
| 7,546,353 B2 | 6/2009 | Hesselink et al. |
| 7,587,467 B2 | 9/2009 | Hesselink et al. |
| 7,600,036 B2 | 10/2009 | Hesselink et al. |

(Continued)

FOREIGN PATENT DOCUMENTS

| | | |
|---|---|---|
| WO | 2005022321 A2 | 3/2005 |
| WO | 2010113167 A1 | 10/2010 |

OTHER PUBLICATIONS

Tamir Ram, et al., U.S. Appl. No. 14/246,706, filed Apr. 7, 2014, 21 pages.

(Continued)

*Primary Examiner* — Than Nguyen
(74) *Attorney, Agent, or Firm* — Chang & Hale LLP (57) ABSTRACT

Systems and methods are disclosed for performing file backup and restore in a computing system. Certain embodiments provide a communication interface for communicating with a non-volatile memory and a controller configured to determine that a file stored in the non-volatile memory has been modified, identify a chunk of the file that has been modified, determine a new chunk associated with the modified chunk, the new chunk reflecting the modification, generate a separate chunk file including the new chunk and a filename, and storing the chunk file in the non-volatile memory using the communication interface.

20 Claims, 5 Drawing Sheets

(56) References Cited

U.S. PATENT DOCUMENTS

| | | |
|---|---|---|
| 7,788,404 B2 | 8/2010 | Hesselink et al. |
| 7,917,628 B2 | 3/2011 | Hesselink et al. |
| 7,934,251 B2 | 4/2011 | Hesselink et al. |
| 7,949,564 B1 | 5/2011 | Hughes et al. |
| 8,004,791 B2 | 8/2011 | Szeremeta et al. |
| 8,209,540 B2 | 6/2012 | Brouwer et al. |
| 8,255,661 B2 | 8/2012 | Karr et al. |
| 8,285,965 B2 | 10/2012 | Karr et al. |
| 8,341,117 B2 | 12/2012 | Ram et al. |
| 8,341,275 B1 | 12/2012 | Hesselink et al. |
| 8,352,567 B2 | 1/2013 | Hesselink et al. |
| 8,458,131 B2 | 6/2013 | Bindal et al. |
| 8,489,611 B2 | 7/2013 | Tofano |
| 8,526,798 B2 | 9/2013 | Hesselink |
| 8,631,284 B2 | 1/2014 | Stevens |
| 8,646,054 B1 | 2/2014 | Karr et al. |
| 8,661,507 B1 | 2/2014 | Hesselink et al. |
| 8,688,797 B2 | 4/2014 | Hesselink et al. |
| 8,713,265 B1 | 4/2014 | Rutledge |
| 8,762,682 B1 | 6/2014 | Stevens |
| 8,780,004 B1 | 7/2014 | Chin |
| 8,793,374 B2 | 7/2014 | Hesselink et al. |
| 8,819,443 B2 | 8/2014 | Lin |
| 2005/0144195 A1 | 6/2005 | Hesselink et al. |
| 2005/0144200 A1 | 6/2005 | Hesselink et al. |
| 2008/0250085 A1 | 10/2008 | Gray et al. |
| 2008/0270436 A1* | 10/2008 | Fineberg et al. ............. 707/101 |
| 2010/0106691 A1* | 4/2010 | Preslan et al. ................ 707/674 |
| 2010/0211983 A1 | 8/2010 | Chou |
| 2010/0250885 A1 | 9/2010 | Nakata |
| 2011/0213754 A1 | 9/2011 | Bindal et al. |
| 2011/0218969 A1* | 9/2011 | Anglin et al. ................ 707/679 |
| 2012/0036041 A1 | 2/2012 | Hesselink |
| 2012/0054156 A1 | 3/2012 | Mason, Jr. et al. |
| 2012/0084523 A1* | 4/2012 | Littlefield ........... G06F 11/1469 711/162 |
| 2012/0317359 A1 | 12/2012 | Lillibridge |
| 2013/0060739 A1* | 3/2013 | Kalach .............. G06F 17/30159 707/692 |
| 2013/0144840 A1* | 6/2013 | Anglin ................ G06F 11/1453 707/640 |
| 2013/0212401 A1 | 8/2013 | Lin |
| 2013/0246366 A1* | 9/2013 | Preslan et al. ................ 707/652 |
| 2013/0266137 A1 | 10/2013 | Blankenbeckler et al. |
| 2013/0268749 A1 | 10/2013 | Blankenbeckler et al. |
| 2013/0268759 A1 | 10/2013 | Blankenbeckler et al. |
| 2013/0268771 A1 | 10/2013 | Blankenbeckler et al. |
| 2014/0032499 A1 | 1/2014 | Li et al. |
| 2014/0095439 A1 | 4/2014 | Ram |
| 2014/0149699 A1 | 5/2014 | Yakushev et al. |
| 2014/0169921 A1 | 6/2014 | Carey |
| 2014/0173215 A1 | 6/2014 | Lin et al. |
| 2014/0344539 A1 | 11/2014 | Gordon et al. |
| 2015/0186371 A1* | 7/2015 | Xu et al. ........................ 707/638 |
| 2015/0186407 A1* | 7/2015 | Xu et al. ........................ 707/638 |

OTHER PUBLICATIONS

International Search Report and Written Opinion for PCT/US2016/024181 dated Jul. 5, 2016.

* cited by examiner

DATA DEDUPLICATION USING CHUNK FILES

BACKGROUND

In computer systems, backup of data to a backup data store can provide data redundancy that allows for data to be restored after a data loss event.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

DETAILED DESCRIPTION

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

The headings provided herein are for convenience only and do not necessarily affect the scope or meaning of the claims. Disclosed herein are example configurations and embodiments relating to backing up data in a computing system.

Overview

According to various data deduplication processes, backing up of data involves splitting files into smaller chunks of data and, in order to save space and/or data transfer time, only saving those chunks that have changed during backup. In certain embodiments, a hash value is calculated for each hashable chunk of a file, such that the changed chunks may be identified by comparing hash values and identifying chunks that have changed hash values associated therewith. Such a process may provide a number of benefits. For example, if a chunk has not changed, such chunk is not saved, thereby saving data storage resources. In addition, if a hash value for a particular chunk in a file is found in another file, such chunk may be reused for the second and/or subsequent files; the redundant chunk is not saved again, and a corresponding entry in a metadata list of hashes for this file is instead updated to reflect the relationship.

For containerized backup, certain solutions provide for modified or new chunks associated with a file to be appended to a comprehensive file, or blob, wherein the comprehensive file/blob is continually expanded to include the modified/new chunks. However, certain backup systems may not allow for appending of chunks to files/blobs within the backup system, or such operation may be inconvenient or impractical. For example, a backup server may not provide a public-facing application programming interface (API) that would allow for a client system to cause modified/new chunks to be saved in the backup server without downloading the entire relevant file to the client first. Therefore, it may be necessary in such systems to pull a file down from the backup system, append modified/new chunks thereto, and push the entire file/blob including the appended chunks back up to the backup system, which may introduce various data transfer inefficiencies.

Certain embodiments disclosed herein provide for improved backup efficiency in systems that may not allow for appended writing of chunks by generating stand-alone files for each modified/new chunk to be backed up. In certain embodiments, unique file chunks are associated with unique hash values that provide mapping information indicating where the chunk file resides in non-volatile storage of the backup system. With individual chunk files saved to the backup data store, there may be no need to append new chunks to a single blob or other comprehensive data structure.

Data Storage System

Figure 1:
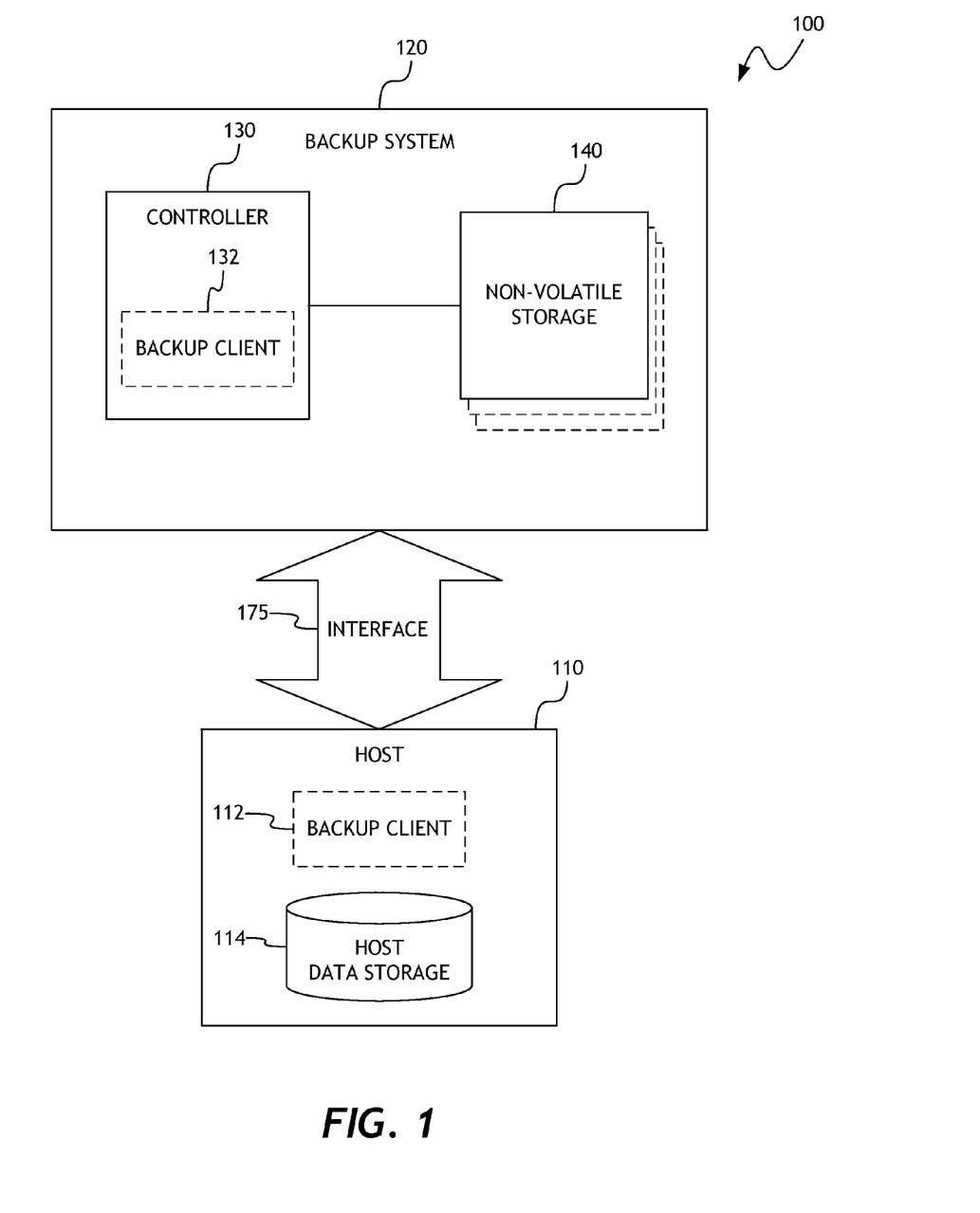
FIG. 1 is a block diagram of a computing system according to one or more embodiments.

FIG. 1 is a block diagram of a computing system 100 including a data storage backup system 120 and a host system 110 communicatively coupled to the backup system 120 over an interface 175. The interface 175 may be a wired or wireless interface connection, or any other type of communication interface such as, for example, SATA, USB, Thunderbolt, Ethernet, Wi-Fi, Bluetooth, PCIe, or the like.

The host system 110 may comprise one or more computing devices including one or more processors configured to execute code. The host 110 may further comprise one or more data storage modules, such as the host data storage data store 114 illustrated in FIG. 1. In certain embodiments, the host 110 may store user data in the host data store 114.

It may be desirable for the host system 110 to implement data redundancy by backing up user data to the backup system 120 in order to reduce the risk of data loss, or for other reasons. The host 110 may be configured to backup at least a portion of data stored in the host data store 114 to one or more external backup systems, including the backup system 120. The backup system 120 may be configured to receive data from the host system 110 over the interface 175 and backup such data in one or more nonvolatile storage modules 140, as directed by a backup client. The illustrated system 100 shows a backup client 132 implemented within a controller 130 of the backup system 120. Alternatively or additionally, the system 100 may be configured to implement data backup as directed by a backup client 112 that is a component of the host system 110. In certain embodiments described below, backup operations are advantageously directed by the backup client 112 of the host system 110. However, it should be understood that backup client logic may reside in any desirable or practical location within the scope of the present disclosure.

In certain embodiments, the backup system 120 comprises a direct-attached storage device (DAS). Alternatively, the backup system 120 may be a remote backup server system coupled to the host system 110 over a computer network, such as the Internet.

The backup client 112 of the host system 110 may issue read and/or write commands to the backup system 120 directing the backup system to save copies of data in the nonvolatile storage 140 of the backup system 120. In certain embodiments, the backup system 120 further maintains certain metadata tables or other data facilitating efficient backup and maintenance of user data in the non-volatile storage 140.

The backup client logic may be configured to implement data deduplication, which may involve identifying and removing or preventing duplication of data within the data storage 140 without compromising data fidelity and/or integrity. Deduplication may provide resiliency during hardware failures, and may further provide checksum validation on data and metadata, as well as redundancy for metadata and chunk data (e.g., frequently-accessed data chunks).

In order to facilitate deduplication functionality, the backup client (132 and/or 112) may segment files into smaller-sized chunks (e.g., 32-128 KB), which may be variable in size in certain embodiments. The backup client may further identify duplicate chunks and maintain a single copy of each chunk. Redundant copies of the chunks may be replaced by references to the single copy, such references being described in metadata table(s). In certain embodiments, chunks are compressed and then organized into container files for containerized backup.

The term "chunk" is used herein according to its broad and ordinary meaning and may refer to any allocation or collection of data in any type of form or structure. Furthermore, references to "chunks" herein may be applicable to any type of data structure, such as chunks, heaps, blobs, files, blocks, pages, or other data structure. Chunks described herein may be of fixed or arbitrary size. In certain embodiments, chunk size may change dynamically.

For data deduplication purposes, files may be replaced with stubs that point to data blocks that are stored within a common chunk store of the non-volatile storage 140. During file access, the correct blocks/chunks may be assembled and served to the host system 110. The backup client (112/130) may further implement one or more data maintenance operations with respect to the non-volatile storage 140, such as optimization, garbage collection, wear leveling and/or scrubbing.

In order to implement deduplication functionality, the backup system 120 and/or host system 110 may maintain metadata indicating associations between files and chunks associated therewith, as well as hash values or other identifiers associated with the various files and/or chunks in order to allow for the identification of modifications or changes in user data that necessitate backing up or saving of such modified or changed file data according to the relevant deduplication protocol.

In certain embodiments, the system 100 is configured to save each hashable unit of a file as a separate chunk file. Such chunk files may be named with the hexadecimal hash value associated with the respective chunks. In certain embodiments, separate chunk files are save with a ".hash" file extension. The saving of chunks as separate chunk files may at least partially alleviate the need to append chunks to an ever-growing file or blob, as described above. Therefore, where backup repositories do not provide a method of appending chunks to a remote file, embodiments disclosed herein may allow for saving of modified/new chunks by the host system 110 in the backup system 120. For example, rather than calling an append function for appending the chunk to the file, a simple file save function may be called by the host system 110 to save the separate chunk files in the backup system 120.

Although not illustrated, the backup system 120 and host system 110 may include various other components and or features, such as a volatile and/or nonvolatile memory modules, data transmission channels/interfaces, and/or, and/or processors, state machines, or other computational components.

Chunk-Level Files

Figure 2A:
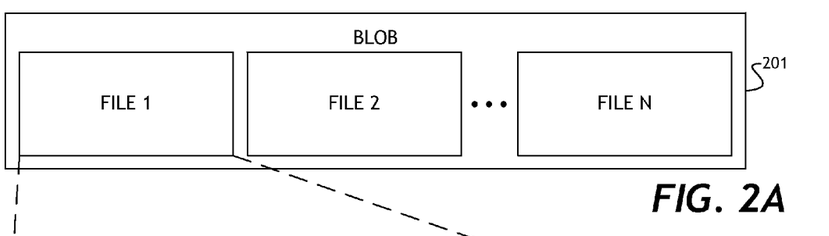
FIG. 2A is a block diagram illustrating a data blob including a plurality of files according to one or more embodiments.

FIG. 2A is a block diagram illustrating an embodiment of a data blob 201 of user data, the blob 201 including a plurality of files (File 1-File N). The term "blob" is used herein according to its broad and ordinary meeting and may refer to any of a plurality of types of data structures or units of data that may be stored in a backup data store. For example, "blob" may refer to a binary large object, file, stream, digital document, table, directory, database, archive, object, or other type of data structure, or collection of data in an unstructured, semi-structured or structured data storage environment. Furthermore, a blob may contain any type of data, such as images, audio or other multimedia objects, binary executable code, or other type of data. The blob 201 may have any desirable or practical size, such as approximately 2 GB, 4 GB, or some other value. The blob 201 may include any number of files of data, such as user data.

Figure 2B:
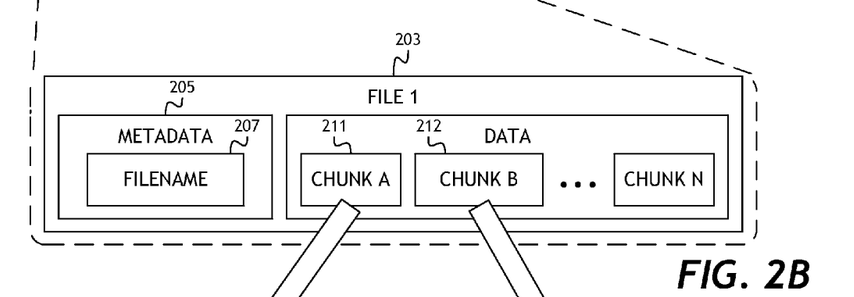
FIG. 2B is a block diagram illustrating a data file having a plurality of chunks of data according to one or more embodiments.

In certain embodiments, a file of user data may comprise a plurality of chunks of user data, each chunk representing a sub portion of the user data of the file. FIG. 2B illustrates a block diagram showing a file 203 having a plurality of chunks (Chunk A-Chunk N). The file 203 may further include metadata 205 associated with the user data of the file, such as a filename 207 or other file identifier.

As described above, in certain backup solutions, modified/new chunks may be appended to an ever-growing file, wherein file offset and chunk length data may be maintained in the backup data store for locating such chunks. However, as not all backup repositories may be configured to support appending chunks to files in such a manner, it may be desirable for individual chunks to be saved as separate files in certain situations, as disclosed herein. Furthermore, the separate chunk files may be named with the hash value (e.g., hexadecimal value) of the respective chunk. For illustration purposes, a chunk file may be named as, for example, "08EF8A59CC3B17D9.hash," or other hash value and/or file extension.

Figure 3A:
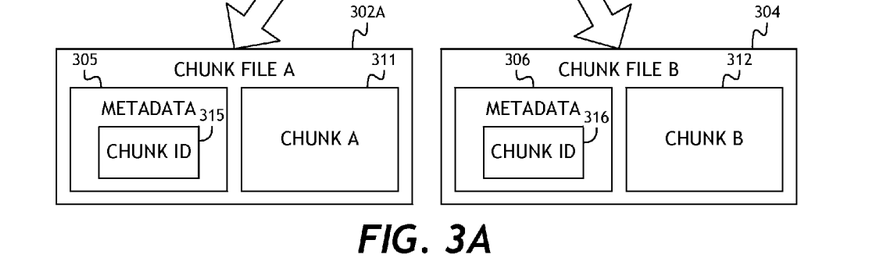
FIG. 3A is a block diagram illustrating an individual chunk file according to one or more embodiments.

The separate files stored for individual chunks of data are referred to herein as "chunk files." As shown in FIG. 3A, an individual chunk 311 (chunk A) may be saved as an individual chunk file 302A, wherein the chunk file comprises the chunk data 311 as well as certain metadata 305 associated with the chunk, such as a chunk identifier 315. The chunk identifier 315 may be, for example, a filename associated with the chunk file 302A, or the like. Other chunks of the file 203 may likewise be saved as separate chunk files, such as Chunk File B 304, shown in FIG. 3A. Similarly to the chunk file 302A, the chunk file 304 includes metadata 306 including a chunk identifier 316, as well as the chunk data 312. Utilization of chunk files like that shown in FIG. 3B may advantageously result in reducing the amount of data that needs to be saved, which may in turn free up resources for other purposes.

Figure 3B:
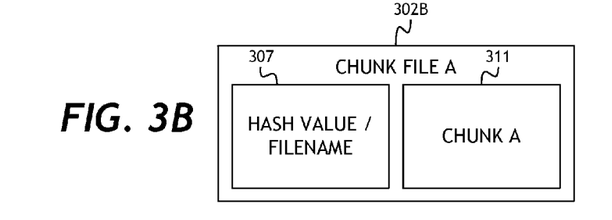
FIG. 3B is a block diagram illustrating a chunk file according to one or more embodiments.

FIG. 3B illustrates a chunk file 302B, wherein the chunk file 302B includes a filename 307. In certain embodiments, the filename 307 may be, or correspond to, a hash value of the chunk data 311. For example, in certain embodiments, a hash value is calculated for each hashable chunk of a file for purposes of identifying changes in data for deduplication. As shown in FIG. 3B, such hash value may double as the filename of the chunk file 302B, which may allow for efficient storage of metadata, wherein only a single value is stored for the hash value and the filename of the chunk file.

As described above, data deduplication is often used to backup only those portions of a file that have changed or are new and to reuse chunks of files across many files. In order to determine changes and/or new file chunks, a hash algorithm may be run over one or more portions (e.g., chunks) of a file that has changed to generate a hash value for each chunk. In certain embodiments, the hash algorithm produces a unique hash value in order to avoid collisions that may otherwise cause problems during data reassembly.

The backup client may be configured to compare the newly calculated hash values to a list of saved hash values associated with the file. If the hash value has changed for a chunk or chunks of the file, only those changed chunks are saved as chunk files in certain embodiments. If a hash value is recognized as already being present in the backup destination repository, due to the uniqueness of the hash values, the new chunk may not need to be saved, and may be marked as already being saved.

Filename Directory Location Identification

Figure 4:
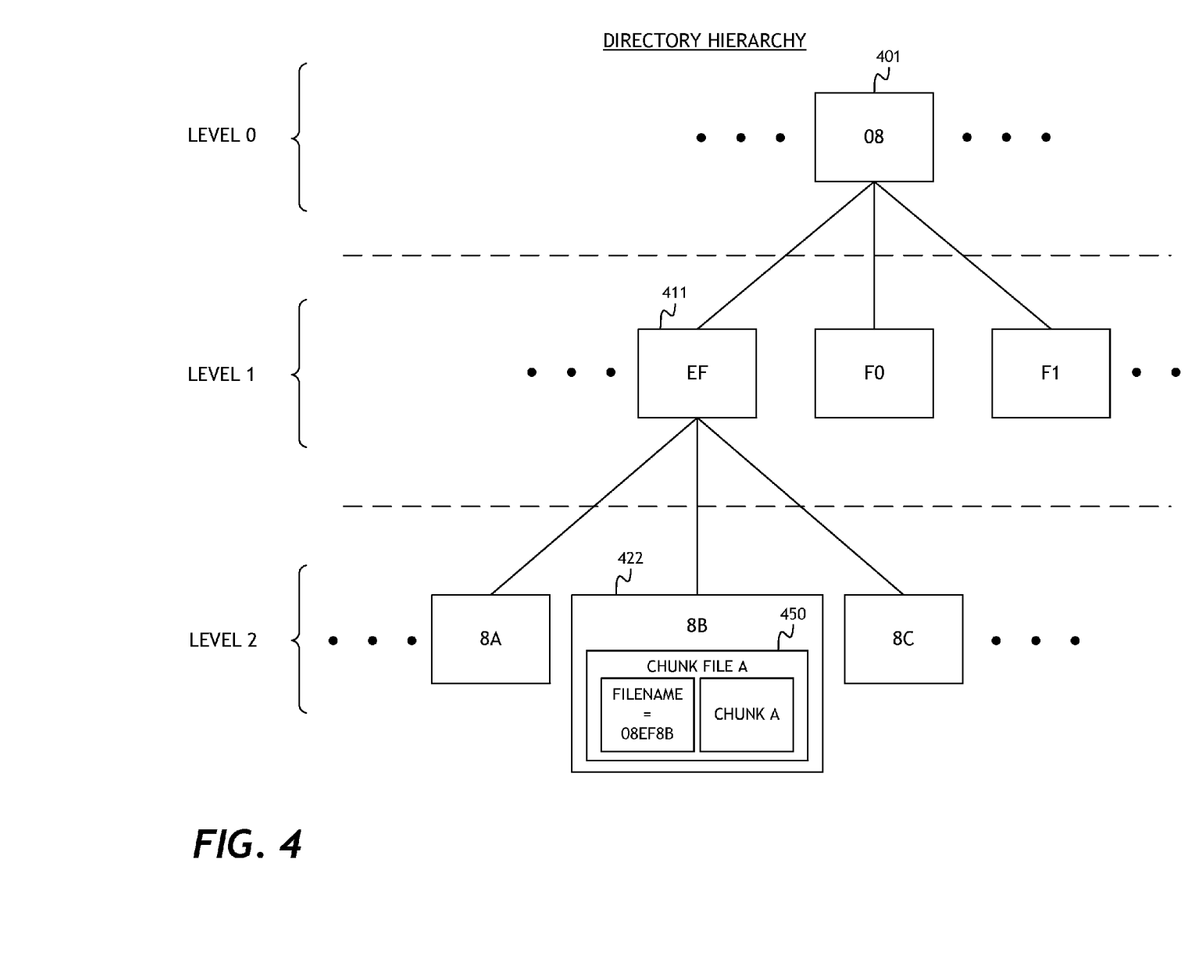
FIG. 4 is a block diagram illustrating a file directory hierarchy according to one or more embodiments.

FIG. 4 is a block diagram illustrating a file directory hierarchy according to one or more embodiments disclosed herein, wherein chunk files may be saved in various folders of the hierarchy. Generally, it may be desirable to avoid situations in which too many files are stored in a single directory folder, which may undesirably introduce excess overhead and/or result in prolonged chunk file storage and retrieval times. In order to avoid storing too many chunk files in a single directory, the chunk files may be saved into a directory hierarchy with each folder named for a byte or other portion or partition of the relevant hash value (e.g., hexadecimal hash value) format. The illustrated hierarchy of FIG. 4 is described below with reference to an example hash format including a three-byte hexadecimal hash value. Although the three-byte hexadecimal value is used for descriptive purposes, it should be understood that values of any format or length may be implemented, depending on the particular hashing convention implemented.

In certain embodiments, the path to the storage location of a hash file is encoded into the filename of the chunk file for ease of lookup. As a result, there may not be a need to save a separate path value into the data store that indexes the files that have been backed up. As shown, certain characters, symbols or bits/bytes of the filename may be associated with different levels of the filesystem hierarchy, and may identify a file location path within the hierarchy. As the hash values associated with the various saved chunk files may be, by their nature, unique values, certain embodiments therefore take advantage of such uniqueness for the purpose of reducing the amount of metadata necessary to locate the chunk files in the file directory.

FIG. 4 illustrates an example showing how such a directory path-identifying filename mechanism may be implemented. As an example, a file, such as a chunk file 450, may have a filename "08EF8B." In the illustrated embodiment, each two symbols of the hexadecimal value may represent a separate level in the directory hierarchy. That is, for example, the first two symbols (or, e.g., the last two symbols) of the filename value may correspond to a highest level in the directory hierarchy. Although in the illustrated embodiment two symbols of the filename correspond to each of the respective levels of the directory hierarchy, other numbers of symbols or subsets of the filename value/string may be used to identify the various levels of the directory hierarchy.

With respect to the example filename "08EF8B," therefore, "08" may identify a highest level (Level 0) folder 401 of the relevant directory hierarchy. Therefore, the file 450 may be identified as being saved in a subfolder, or child folder, of the parent folder 401. The remaining symbols of the filename may identify each of the remaining levels of the hierarchy. For example, as shown, the third and fourth symbols "EF" may identify the next level folder 411 under which the file 450 is stored.

The last two characters "8B" identify the child subfolder 422 in which the file 450 is stored. As shown, the file 450 may be a chunk file including the filename, which is the storage location-identifying string described above identifying the storage location of the chunk file 450. The chunk file 450 further includes the chunk data.

By implementing the storage location path in this manner, embodiments disclosed herein may provide for reduced metadata requirements, as it may not be necessary to store file offset and number of bytes, as well as storage path information in the data store. Directory trees like that shown in FIG. 4 may further provide for relatively quick and easy access to chunk files.

File Backup/Restore Processes

Figure 5:
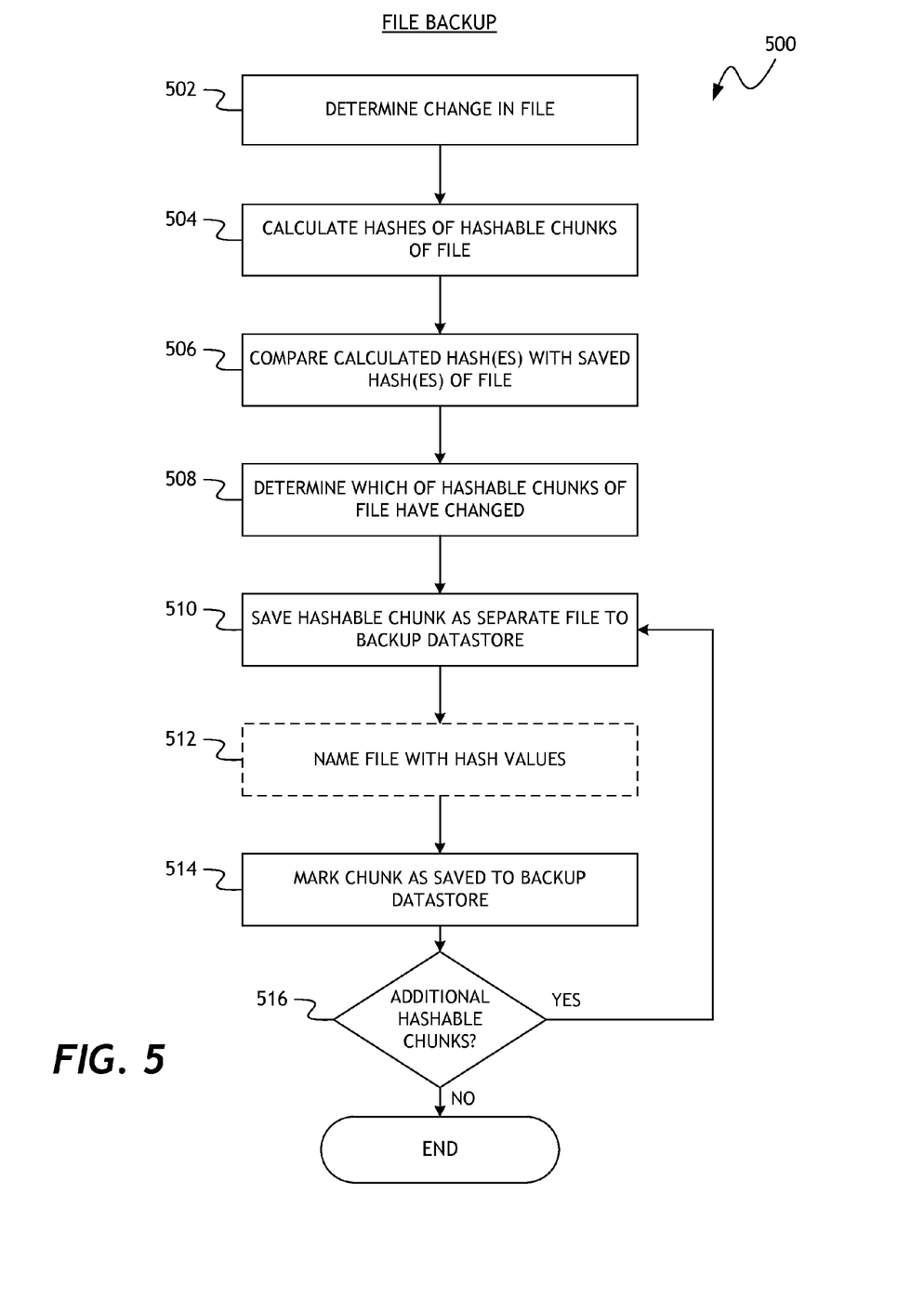
FIG. 5 is a flow diagram illustrating a process for backing up a file according to one or more embodiments.

FIG. 5 illustrates a process 500 for backing up a file in a backup system. At block 502, the process 500 involves determining that a file backed up or to be backed up in a backup system has changed. For example, the file may be a new file not previously stored in the backup system, or the file may have been modified by a host, wherein such modifications are intended to be captured in the backup system. In certain embodiments, the backup client receives a notification of a change in the file.

At block 504, the process 500 involves calculating hashes of hashable chunks of the file. Such step may involve identifying hashable chunk portions of the file and calculating hash values associated with one or more of the hashable chunks. In certain embodiments, the process 500 involves calculating hashes for only those chunks of the file that have been modified or her new.

At block 506, the process 500 involves comparing the calculated hashes of the file with saved hashes associate with file. Based on such comparison, the process 500 and involves determining which of the hashable chunks of the file have changed at block 508. For example, the process 500 may involve determining whether a newly-generated hash value already exists in the relevant storage module; if the generated hash does not already exist in the storage module, such absence may indicate that the associated chunk is new or modified, and therefore need to be backed up.

At block 510, the process 500 involves saving the modified or new chunks as separate files in the backup data store. The separate chunk files may include certain metadata or chunk identifier data, as well as the chunk data. That is, instead of appending new/modified chunks to an evergrowing file, the chunk may be saved as a standalone file. This may allow the backup client to use standard file I/O operations across different backup destination repository media types, including third-party destinations that do not support file append operations.

Certain embodiments, as shown at block 512, the separate chunk files may have filenames that includes the hash value of the respective chunk being saved. For example, the chunk file may be named with a hexadecimal representation of the hash of the chunk, and may have a ".hash" file extension. As described in greater detail above, in certain embodiments, the hash value filenames may be used to identify a storage location where the chunk file is stored.

At block 514, the process 500 involves marking the new or modified chunk as to the backup data store. If additional chunks remain to be saved as chunk files, the process 500 involves looping back to block 510 from the decision block 516.

Figure 6:
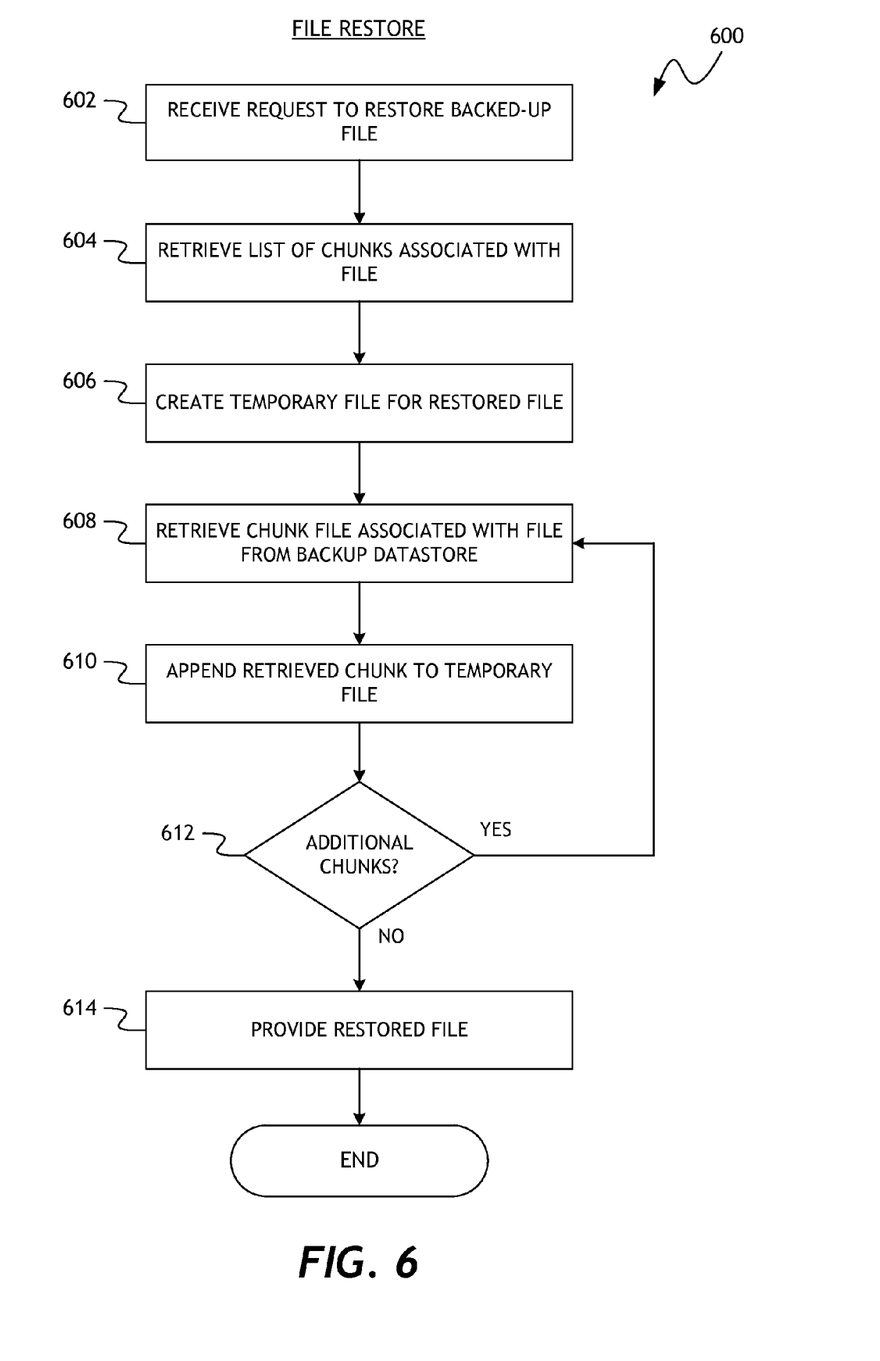
FIG. 6 is a flow diagram illustrating a process for restoring a file from a backup store according to one or more embodiments.

FIG. 6 illustrates a process 600 for restoring a file from a backup store according to one or more embodiments disclosed herein. The process 600 involves, at block 602, receiving a request to restore a file that has been backed up in the backup data store. The request may indicate a particular version of the file to restore, where different versions of the file corresponding to different periods of time for example are tracked and/or maintained in the backup system. For example, a relevant backup client may receive a notified that a user would like to restore a version of a file that has been backed up.

At block 604, the process 600 involves retrieving a list of chunks associated with the requested file. For example, the list may be maintained in the backup system, such as in the backup data store, as a mechanism for tracking the locations of chunk files associated with particular files. The chunks may be hashable chunks of the file that constitute the requested version of the file. The process may involve by consulting the backup data store for the file to retrieve the list and/or identified chunks.

At block 606, the process 600 involves creating a temporary file corresponding to the requested restored file. The temporary file may be built as the restored file to provide back to the host. The blocks 608-612 illustrate a loop for iteratively retrieving each of the individual chunk files associated with the requested file. That is, at block 608, a chunk file associated with the requested files or tree from the backup data store, and the chunk of the retrieved chunk file is appended to the temporary file at block 610. Because hashable chunks of the file are read as files instead of offsets and lengths from a larger file, the backup solution illustrated in FIG. 6 may be compatible across different backup platforms, as support for reading and writing a file may be more broadly available than support for file append and/or reading of arbitrary chunks of a file. Therefore, embodiments disclosed herein may allow a backup client to use standard file I/O operations across different backup destination repository media types.

If additional chunks remain of the file that have not yet been retrieved, at decision block 612, such determination is made and, if chunks remain, the process 600 returns to block 608 and groups until all of the chunks associated with the requested file have been retrieved and appended to the temporary file. The hashable chunks of the file may be retrieved from the backup destination repository using the hash value of the chunk to determine the hashable chunk file name, wherein the file path is identified by the filename itself, as described above. At block 614, the process 600 involves providing the restored file to, for example, a host system. The file may be restored to a location and/or name provided by the user.

Embodiments disclosed herein may provide various benefits over certain existing backup solutions. For example, the disclosed backup solutions may be compatible with a substantial number of third-party data repositories that may be used by host-side backup clients. For example, such improved efficiency may be particularly evident when, for example, a single word in a relatively large document is modified, or adjusts a small number of pixels in a relatively large image file are modified. In such a scenario, according to certain embodiments disclosed herein, only the portion of the file that changed, and not the entire file, is saved, thereby saving time and/or resources.

Additional Embodiments

Those skilled in the art will appreciate that in some embodiments, other types of data backup systems can be implemented while remaining within the scope of the present disclosure. In addition, the actual steps taken in the processes discussed herein may differ from those described or shown in the figures. Depending on the embodiment, certain of the steps described above may be removed, and/or others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, application-specific integrated circuit (ASIC), field-programmable gate array (FPGA), or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

All of the processes described above may be embodied in, and fully automated via, software code modules executed by one or more general purpose or special purpose computers or processors. The code modules may be stored on any type of computer-readable medium or other computer storage device or collection of storage devices. Some or all of the methods may alternatively be embodied in specialized computer hardware.

What is claimed is:

1. A computing system comprising:
   a communication interface for communicating with a non-volatile memory; and
   a controller configured to:
      determine that a file stored in the non-volatile memory has been modified, the file comprising a plurality of chunks;
      identify a chunk of the plurality of chunks that has been modified, the plurality of chunks consisting of the identified modified chunk and a plurality of other chunks;
      determine a new chunk associated with the modified chunk, the new chunk reflecting the modification;
      generate a stand-alone chunk file including the new chunk and a filename; and
      store the chunk file in the non-volatile memory separate from the plurality of other chunks using the communication interface.

2. The computing system of claim 1, wherein the filename indicates a storage location within a file directory associated with the non-volatile memory, wherein said storing the chunk file comprises storing the chunk file in the location.

3. The computing system of claim 2, wherein no path value for the location is stored by the controller separately from the filename.

4. The computing system of claim 1, wherein: the controller is a component of a host device connected to a data storage device over the communication interface;
the data storage device includes the non-volatile memory.

5. The computing system of claim 1, wherein the non-volatile memory and the controller are components of a network-attached storage (NAS) drive or a direct-attached storage (DAS) drive.

6. The computing system of claim 1, wherein the controller is further configured to generate a hash value associated with the new chunk.

7. The computing system of claim 6, wherein the hash value is the filename.

8. The computing system of claim 1, wherein the chunk file is a hash file.

9. The computing system of claim 1, wherein the controller is further configured to reconstruct the file at least in part by:
receiving a request to restore a version of the file;
identifying one or more chunk files associated with the version of the file, the one or more chunk files including the chunk file;
retrieving the one or more identified chunk files; and
appending the retrieved one or more chunk files to a restored file.

10. The computing system of claim 9, wherein said retrieving the one or more identified chunk files comprises determining one or more directory locations based on filenames of the one or more identified chunk files.

11. The computing system of claim 9, wherein the controller is further configured to retrieve a table associating files with chunks.

12. The computing system of claim 9, wherein the controller is further configured to provide the restored file to a host device over a network, wherein the computing system is a backup server system.

13. A method of backing up data in a computing system, the method comprising:
determining that a file stored in non-volatile memory of a computing system has been modified, the file comprising a plurality of chunks;
identifying a chunk of the plurality of chunks that has been modified, the plurality of chunks consisting of the identified modified chunk and a plurality of other chunks;
determining a new chunk associated with the modified chunk, the new chunk reflecting the modification;
generating a stand-alone chunk file including the new chunk and a filename; and
storing the chunk file in the non-volatile memory separate from the plurality of other chunks.

14. The method of claim 13, wherein the filename indicates a storage location within a file directory associated with the non-volatile memory.

15. The method of claim 13, further comprising generating a hash value associated with the new chunk.

16. The method of claim 13, wherein the chunk file is a hash file.

17. A method of restoring backed-up data in a computing system, the method comprising:
receiving a request to restore a version of a file stored in non-volatile memory of a computing system;
identifying one or more stand-alone chunk files stored in the non-volatile memory associated with the version of the file, each of the one or more chunk files consisting of a single respective chunk and metadata associated therewith, the metadata including a filename;
retrieving the one or more identified chunk files; and
appending the retrieved one or more chunk files to a restored file.

18. The method of claim 17, wherein said retrieving the one or more identified chunk files comprises determining one or more directory locations based on filenames of the one or more identified chunk files.

19. The method of claim 17, further comprising retrieving a table associating files with chunks.

20. The method of claim 17, wherein the filename of each of the one or more chunk files is a hash value associated with a respective chunk file.

* * * * *